INVENTOR.
EDWARD J. PAGENDARM
BY
Townsend and Townsend
ATTORNEYS

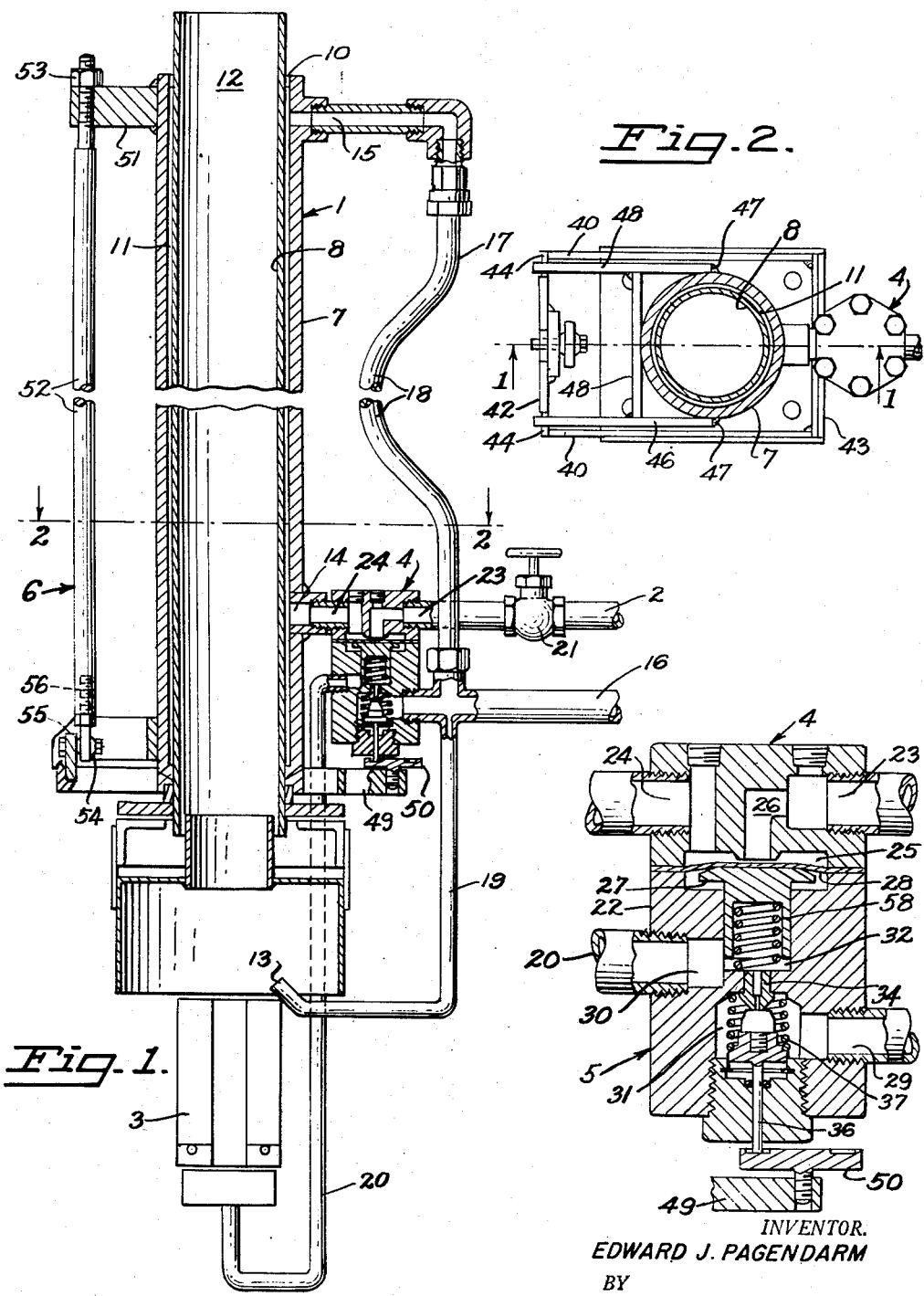
March 1, 1955 — E. J. PAGENDARM — 2,702,989
THERMOSTATIC CONTROL FOR VAPORIZERS
Filed Feb. 4, 1952 — 2 Sheets-Sheet 1
INVENTOR.
EDWARD J. PAGENDARM
BY
Townsend and Townsend
ATTORNEYS March 1, 1955 E. J. PAGENDARM 2,702,989
THERMOSTATIC CONTROL FOR VAPORIZERS
Filed Feb. 4, 1952 2 Sheets-Sheet 2

United States Patent Office 2,702,989
Patented Mar. 1, 1955

2,702,989

THERMOSTATIC CONTROL FOR VAPORIZERS

Edward J. Pagendarm, San Mateo, Calif.

Application February 4, 1952, Serial No. 269,879

3 Claims. (Cl. 62—1)

This invention relates to thermostatic controls and the specific embodiment is particularly useful in combination with liquid petroleum gas vaporizers and the like.

An object of this invention is to provide a positive-acting, simple thermostatic control of sturdy construction.

An additional object of this invention is to provide a thermostatic control which will retain for indefinite periods of time an adjustment once made.

A further object of this invention is to provide a fluid circuit incorporating the foregoing thermostatic control as one of its elements.

The foregoing and other objects inherent in this invention will become apparent to those skilled in the art from the following description of a specific embodiment of this invention.

In the drawings:

Fig. 1 is a diagrammatic illustration of a selected embodiment of this invention taken on the line 1—1 of Fig. 2 with certain of the parts shown in longitudinal section;

Fig. 2 is a cross sectional view of the structure illustrated in Fig. 1 taken along the line 2—2 of Fig. 1;

Fig. 3 is an enlarged longitudinal section of the valve illustrated in longitudinal section in Fig. 1.

Figure 4:
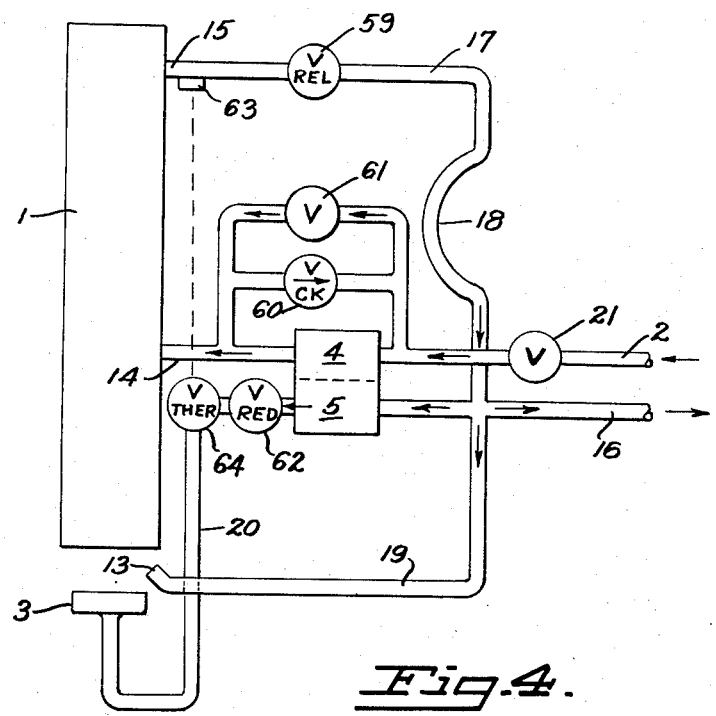
Fig. 4 is a diagrammatic flow sheet showing the gas and liquid flow and the location of certain accessories.

This invention is illustrated in combination with and incorporates as a part of its environment a heat exchanger which is used to convert liquid petroleum gas to vapor.

In the past, difficulties have been experienced in coordinating the delivery of liquid to the vaporizer with the delivery of the vapor from the vaporizer. Complicated control mechanisms have been devised. Some have been thermostatically controlled and others pressure controlled. Examples appear in such patents as the John K. Heller Reissue Patent No. 22,556, reissued October 24, 1944, and the John K. Heller Patent No. 2,497,549, issued February 14, 1950.

The controls illustrated in these prior art patents are subject to disadvantages well known to the art and this invention is directed primarily toward producing a more positive, a sturdier and a simpler control than any of those illustrated in the foregoing and in other patents.

The components used in the selected embodiment of this invention include a heat exchanger 1 for converting liquid petroleum gas to vapor, a source 2 of liquid petroleum gas, a burner 3 for supplying heat to the heat exchanger, a valve 4 for controlling the flow of liquid petroleum gas from its source to the heat exchanger, a valve 5 for controlling the flow of fuel to the burner 3 and a thermostatic control 6 for controlling the operation of the device.

In describing the specific embodiment of this invention, the specification firstly will describe the heat exchanger 1; secondly will describe the valves 4 and 5 which control the heat exchanger; thirdly will describe the thermostatic valve control means 6; fourthly will describe the valves in detail; fifthly will describe certain accessories; and finally will describe the operating cycle. It is believed that this will render greatest clarity to understanding the invention.

The heat exchanger

The heat exchanger or vaporizer 1 which is used to convert liquid petroleum gas into vapor comprises an outer tube 7 and an inner tube 8 of lesser exterior diameter than the interior diameter of the tube 7. The two tubes are arranged concentrically and are joined together adjacent their ends by suitable annular members 9 and 10. The entire structure is securely fastened together with gas-tight connections so as to form an annular chamber 11 within which the liquid petroleum gas is converted to vapor. The interior 12 of the inner tube 8 is arranged in axial alignment with the burner 3 and provides a flue for the hot gases emitted from the burner. Adjacent the burner 3 there is provided a pilot light 13 for igniting the burner.

In the usual operation of a liquid petroleum gas vaporizer such as is illustrated above, liquid gas under pressure is supplied to the annular chamber 11 of the vaporizer through a liquid inlet passageway 14. Upon entering the annular chamber 11, the liquid is heated to vaporization by the gases from the burner 3 and the vapor is led from the vaporizer through a vapor outlet passageway 15.

Egress is provided for the vapors produced by the vaporizer from the vapor outlet passageway 15 to a gas main 16. These means include a pipe 17 which is provided with a reverse bend 18 to avoid breakage resulting from the expansion of the heat exchanger on heating and its contraction on cooling.

The pilot light 13 is connected to the gas main 16 by means of a pipe 19 to provide a constant source of gas for the pilot light whenever the vaporizer is in operation. Similarly, the burner 3 is connected to the gas main through the burner valve 5 by means of a pipe 20 to provide its source of fuel.

The liquid petroleum gas which is fed to the liquid inlet passageway 14 is supplied to the apparatus through the valve 4 from the source of liquid petroleum gas 2, which is illustrated as a liquid petroleum gas main. A manually operable valve 21 is provided to open and close the liquid petroleum gas main 2.

The liquid valve

The liquid valve 4 is provided to control the flow of liquid petroleum gas from the liquid petroleum gas main 2 to the heat exchanger 1.

The liquid valve 4 is contained in a valve housing 22 and is provided with an inlet port 23, an outlet port 24, and a valve chamber 25. A passageway 26 interconnects the inlet port 23 with the valve chamber 25 and this passageway terminates in an annular lip 27. The valve is opened and closed by means of a flexible diaphragm 28 which is actuated by control mechanism to be described later in this specification. At this point it is sufficient to observe that when the flexible diaphragm 28 is in contact with the annular lip 27, the valve is closed so that there can be no flow of liquid petroleum gas from the gas inlet pipe 20 to the liquid inlet passageway 14. However, when the flexible diaphragm 28 is out of contact with the annular lip 27, then there is provided free passageway for the flow of such liquid petroleum gas.

The vapor valve

The vapor valve 5 is provided to control the passage of fuel to the burner 3. The vapor valve 5 is located in the lower portion of the same housing 22 as that used for the liquid valve 4. The vapor valve 5 is provided with an inlet port 29, an outlet port 30 and lower and upper chambers 31 and 32. The lower chamber 31 and the upper chamber 32 are interconnected with a valve orifice 33 which is drilled through a stationary valve member 34. The valve orifice 33 is opened and closed by a moveable valve member 35 suitably secured to the upper end of a valve stem 36. A spring 37 urges the moveable valve member 35 out of closing contact with the orifice 33 in the stationary valve member 32. It will be apparent that when the moveable valve member 35 is in contact with the orifice 33 in the stationary valve member 34 there will be no flow of gas from the lower chamber 31 to the upper chamber 32. However, when these two valve members are out of contact with one another, the valve orifice 33 will be opened permitting a free passage of gas through the valve. The burner pipe line 20 connects the outlet port 29 with the burner 3. The mode of operation of vapor valve 5 will be described later in this specification.

The thermostatic control

The thermostatic control 6 is provided for actuating the vapor valve 5. Indirectly, it also actuates the liquid valve 4. The operative force for the thermostatic control is provided by the expansion of the heat exchanger upon heating and by its contraction upon cooling. This range of movement is very small and a mechanical advantage is obtained by exerting this operative force through a positive acting leverage system. One end of the vaporizer tube is secured immoveably with respect to one member of the valve and the other end of the vaporizer tube is connected through the leverage system to the other member of the valve.

In the selected embodiment, the valve stem 36 is operated by a lever arm 39. This lever arm 39 is shaped in the general form of a parallelogram with two side arms 40—41 (Fig. 2) and two cross arms 42—43. The lever arm 39 is made in the form of a parallelogram so as to permit the lever arm to encompass the vaporizer. Knife-edge fulcrums 44 are provided adjacent the outer ends of the cross arm 42. A companion fixed fulcrum 45 is provided on the lower edge of each of fulcrum arms 46 for each of the knife edge fulcrums 44. These fulcrum arms in turn are secured adjacent the lower end of the vaporizing chamber as by welding spots 47. A cross brace 48 extending between the two fulcrum arms 46 adds rigidity.

An extension 49 is provided extending outwardly from the mid point of cross arm 43 and forms a mounting for an adjustable tappet 50. The tappet is threadedly inserted into the extension 49 to permit an adjustment of the tappet 50 with respect to the valve stem 36.

The force for operating the lever arm 39 is applied from the opposite end of the vaporizer. A bracket 51 is secured adjacent the opposite end of the vaporizer and an actuating rod 52 extends from the bracket 51 to the lever arm 39. The bracket 51 is made preferably of a material having a low rate of heat transfer and the rod 52 is made preferably of a material having a low coefficient of expansion, such as for example an alloy known as "invar." The actuating rod 52 is secured to the bracket 51 by a threaded nut 53 which provides a means for adjusting the length of the actuating rod 52. The other end of the actuating rod 52 is secured to the lever arm by means of a ball and socket connection 54, which connection is secured to a bracket 55. This bracket 55 is in turn secured to the cross arm 42. A threaded connection 56 is provided adjacent the lower end of the actuating rod 52 to permit further adjustment of the rod length.

The specific mechanical linkage illustrated for this thermostatic control is a class 3 lever. At all times the tension spring of the valve spring 37 urges each of the mechanical elements into abutting contact with its companion element. Thus the knife-edge fulcrums 44 are urged against the fixed fulcrums 45; the threaded nut 53 is urged against the bracket 51; and the valve stem 37 is urged against the tappet 50.

Valve details

The thermostatic control and its companion mechanical linkage described above opens and closes the vapor valve 5 in response to changes in length of the vaporizer 1. Upon cooling, the vaporizer 1 becomes shortened. This permits the spring tension to lower the actuating rod 52 to depress the lever arm 39 and to lower the adjustable tappet 50. This opens the vapor valve 5 and permits a free flow of gas to the burner 3. Upon heating, the chamber becomes longer, the actuating rod 52 is moved upwardly; this moves the lever arm 39 upwardly and closes the vapor valve 5 against the tension of spring 37 thereby shutting off a flow of gas to the burner 3.

Means are also provided, responsive directly to the opening and closing of the vapor valve 5 and indirectly to the contraction and expansion of the heat exchanger 1 for opening and closing the liquid valve 4.

The mechanical elements for opening and closing the liquid valve 4 include a button shaped tappet 57, the lower end of which projects into the upper chamber 32 of the vapor valve 5. The tappet 57 is urged upwardly toward the flexible diaphragm 28 by means of a coil spring 58. The tension of this coil spring is so selected that it will overbalance the highest pressure expected in the passageway 26. Since most tanks of liquid petroleum gas are designed for a maximum pressure of 250 pounds per square inch, in the specific embodiment a spring sufficient to overbalance that pressure is selected. Thereafter, if vapors are present in the heat exchanger, there will be vapor pressure in valve chamber 25. Because the area of the entire upper surface of flexible diaphragm is quite a bit larger than the area thereof underlying the passageway 26, the valve will be opened. Thereafter whenever the vapor valve 5 is opened the pressures in chambers 25 and 32 will be balanced thereby enabling the spring 58 to reclose the valve 4.

Accessories

In addition to the components described above, certain accessories are useful for a proper operation of apparatus.

Means are provided to protect the apparatus from excessive increases in pressure. One such means is a safety or 250# pop-off valve 59 which is connected to pipe 17 to vent off to the atmosphere any excess pressure. Another such means is a check valve 60 which is provided in parallel with the fluid valve 4 and which interconnects the liquid inlet passageway 14 and the liquid petroleum gas inlet pipe 16. In the event of increased liquid pressure, the excess liquid is returned from the vaporizer to the liquid petroleum gas inlet pipe 16.

Means are further provided to supply liquid petroleum gas to the vaporizer for starting the vaporizer. These means include a manually operable bypass valve 61 which is connected in parallel with the liquid valve 4 and which interconnects the liquid inlet passageway 14 with the liquid petroleum gas inlet pipe 16. For starting the apparatus this bypass valve 61 is opened. As soon as normal operation has commenced, the bypass valve 61 is closed so as to permit the automatic operation of the apparatus.

Means are also provided to reduce the pressure of the gas delivered to the burner 3. These means include a pressure reducer 62 which is mounted in the burner pipe 20. It should be mounted as close to the outlet port 30 of the valve 5 as is possible.

Finally, it has been found occasionally the temperature of the vapors emitted from the vapor outlet passageway 15 is too high. A thermostatic control 63 is associated with the vapor outlet passageway 15 and when the temperature rises excessively, this thermostatic control closes a valve 64 located in the burner pipe 20.

Operating cycle

The operation of the selected embodiment is direct and positive.

Assume that there has been a shut down. Since the system has been idle there will be no vapor pressure in the valve chamber 25. Since there is no pressure in chamber 25, the liquid valve 4 will have been closed by the biasing force exerted by the coil spring 58.

In order to start the vaporizer, the liquid valve 21 and the bypass valve 61 are both opened. The liquid passes from the inlet pipe 16, through the liquid valve 21, through bypass valve 61 and into liquid inlet pipe 14.

At the same time, since the vaporizer is cold, the vaporizer will be contracted permitting the actuating rod 52 and the lever arm 39 to lower and causing pressure exerted by the spring 37 to move the adjustable tappet 50 away from the valve stem 36 thereby permitting the vapor valve 5 to open.

Vapor passes from gas main 16 through the inlet port 29, through lower chamber 31 through the valve orifice 33 into the upper chamber 32 and thence through the outlet port 30 to the burner 3. The pilot light 13 will then ignite the burner 3 thereby heating the vaporizer to vaporize the liquid contained in the annular chamber 11. The vapors will pass out through the vapor outlet passageway 15 into the pipe 17.

Upon continued heating of the vaporizer its expansion urges the actuating rod 52 upwardly and the force acting through the lever arm 39 closes the vapor valve 5. As soon as the vapor valve 5 is closed the pressure in the upper chamber 28 drops. But the vapor pressure has now been built up in the valve chamber 25. This creates a pressure differential sufficient to overcome the biasing force of the spring 58 thereby permitting the liquid valve 4 to reopen. Liquid passes through the liquid valve 4 into the annular chamber 11 thereby replenishing the liquid that has been vaporized. Further, the heat absorbed by the incoming liquid and by the vaporization of the incoming liquid cools the heat exchanger 1 thereby contracting it and again opening the vapor valve 5 through the mechanical valve linkage. The cycle is repeated so long as the vaporizer is in operation.

The adjustment of the control mechanism is quite simple. It has been found that more satisfactory results will be obtained if the height of liquid in the vaporizer is approximately half way between the top and the bottom of the vaporizer. This is done by adjusting the control linkage. If the level rises too high the rod 52 is lengthened, and if the level remains too low the rod is shortened. In this connection the threaded nut 53 is used to make the coarse or major adjustments and the tappet 50 is used to make the finer minor adjustments.

Having thus described a selected embodiment of this invention and of the manner and process of making, constructing and using it in such full, clear, concise and exact terms as to enable any person skilled in the art or science to which it appertains to make, construct and use the same and having explained the principle of the machine and the best mode in which the applicant has contemplated applying that principle so as to distinguish it from other inventions, the part, improvement or combination which the applicant claims as his invention or discovery is particularly pointed out and distinctly claimed as follows.

I claim:

1. The combination including a source of liquid petroleum gas; a heat exchanger having a fixed end, a moveable end, an inlet port, and an outlet port; a gas outlet line connected to said outlet port; a control valve comprising first valve and second valve; said first valve having an inlet port and an outlet port, a first chamber connected to the inlet port of said first valve, a second chamber connected to the outlet port of said first valve, a first orifice connecting said first and second chambers, a first valve member for opening and closing said first orifice, first biasing means urging said first valve means out of closing association with said orifice, a manually operable member arranged to close said first valve means against the force of said first biasing means; a gas burner connected to the outlet port of said first valve for heating said heat exchanger; a gas line connected to the inlet port of said first valve for providing a source of gas under pressure for said burner; a mechanical linkage interconnecting the movable end of said heat exchanger with the manually operable member of said first valve; said second valve having an inlet port and an outlet port, a third chamber connected to the inlet port of said second valve, a fourth chamber connected to the outlet port of said second valve, a second orifice connecting said third and fourth chambers, a second valve member adapted to close said second orifice, second biasing means arranged to urge said second valve member into closing contact with said second orifice, a first pressure face arranged to oppose said second biasing means, and a second pressure face arranged to add to said biasing means, said first pressure face being subjected to the pressure within said fourth chamber and said second pressure face being subjected to the pressure within said second valve chamber of said first valve, said second biasing force exerting sufficient force to close said second valve member against the normal pressure contained in said third chamber only but exerting insufficient force to close said valve member against the normal operating pressure contained within said third and fourth pressure chambers; the inlet port of said second valve being connected to said source of liquid petroleum gas and the outlet port of said second valve being connected to the inlet port of said heat exchanger.

2. A control valve comprising a first valve and a second valve; each of said valves having an inlet port and an outlet port; a first chamber connected to the inlet port of said first valve, a second chamber connected to the outlet port of said first valve; a first orifice connecting said first and second chambers; a first valve member for opening and closing said first orifice; first biasing means urging said first valve means out of closing association with said orifice; a manually operable member arranged to close said first valve means against the force of said first biasing means; a third chamber connected to the inlet port of said second valve; a fourth chamber connected to the outlet port of said second valve; a second orifice connecting said third and fourth chambers; a second valve member adapted to close said second orifice; second biasing means arranged to urge said second valve member into closing contact with said second orifice; a first pressure face arranged to oppose said second biasing means; and a second pressure face arranged to add to said second biasing means; said first pressure face being subjected to the pressure within said third and fourth chambers and said second pressure face being subjected to the pressure within said second valve chamber; said second biasing means exerting sufficient force to close said second valve member against the normal pressure contained in said third chamber plus the pressure contained in said fourth chamber when the pressure in said fourth chamber is less than normal operating pressure but exerting insufficient force to close said second valve member against the normal pressure contained in said third chamber plus the pressure contained in said fourth chamber when the pressure in said fourth chamber is at normal operating pressure.

3. The combination including a heat exchanger having a fixed end, a moveable end, an inlet port, and an outlet port; a gas burner for heating said heat exchanger; a gas line for providing a source of gas under pressure for said burner; a gas valve in said gas line, said gas valve including a fixed member and a moveable member; a mechanical linkage interconnecting the moveable end of said heat exchanger with the moveable member of said valve; a liquid valve, said liquid valve including an inlet port, a moveable element for closing said valve inlet port, biasing means for urging said moveable element into closing contact with said valve inlet port, a first pressure face associated with said moveable element urging said moveable element away from said valve inlet port, a first pressure chamber associated with said first pressure face and connected to one of the ports of said heat exchanger, said biasing force exerting sufficient force to close said moveable element against the normal pressure exerted by liquid in said valve inlet port but exerting insufficient force to close said moveable element against the normal operating pressure in said first pressure chamber, a second pressure face associated with said moveable element for urging said moveable element toward said valve inlet port, a second pressure chamber associated with said second pressure face, and said gas valve connecting said second chamber to said source of gas under pressure, whereby pressure in both said chambers is equalized when said gas valve is opened thereby permitting said biasing means to close said moveable element upon the opening of said gas valve and permitting pressure in said first pressure chamber to open said moveable element upon the closing of said gas valve.

References Cited in the file of this patent

UNITED STATES PATENTS

| | | |
|---|---|---|
| 867,560 | Currey | Oct. 1, 1907 |
| 1,574,132 | Smyser | Feb. 23, 1926 |
| 2,456,889 | Olson | Dec. 21, 1948 |
| 2,497,549 | Heller | Feb. 14, 1950 |